(12) United States Patent
Netz

(10) Patent No.: US 6,408,136 B1
(45) Date of Patent: Jun. 18, 2002

(54) ZOOM CAMERA OBSCURA

(76) Inventor: Yoel Netz, 5 Metzada St., Bat Yam 59612 (IL)

( * ) Notice: Subject to any disclaimer, the term of this patent is extended or adjusted under 35 U.S.C. 154(b) by 1 day.

(21) Appl. No.: 09/723,295

(22) Filed: Nov. 28, 2000

(51) Int. Cl.[7] ................ G03B 13/24; G03B 17/00; G01C 5/00
(52) U.S. Cl. ............... 396/72; 396/74; 396/88; 396/147; 396/150; 396/505; 359/448; 356/3
(58) Field of Search ............... 396/72, 74, 88, 396/505, 375, 373, 150, 151, 379, 378, 148, 89, 349, 535, 138, 139, 147, 141; 359/448, 443; 356/3, 8

(56) References Cited

U.S. PATENT DOCUMENTS

| | | | | |
|---|---|---|---|---|
| 822,751 | A | * 6/1906 | Mitchell | ............ 356/3 |
| 3,185,061 | A | * 5/1965 | Westphalen | ............ 396/74 |
| 4,560,865 | A | 12/1985 | Bergström | ...... 250/214 VT |
| 5,023,641 | A | * 6/1991 | Merrick | ............ 396/88 |

OTHER PUBLICATIONS

Pinhole Camera Activity, "The Pinhole Scope", Dec.–1999, http://acept.la.asu.edu/PIN/act/pinhole/pinhole.shtml.*

* cited by examiner

Primary Examiner—W. B. Perkey
(74) Attorney, Agent, or Firm—Mark M. Friedman

(57) ABSTRACT

A portable zoom camera obscura comprising: a telescopic structure including an inner tube and an outer tube positioned concentrically and slidingly movable relative to each other; a cover with a small, centered imaging hole attached to the imaging end of the outer tube; a semitransparent screen covering the inner end of the inner tube; a cover having a viewing hole and attached to the viewing end of the inner tube; and a diaphragm disk or ruler mounted on the imaging end, and including an aperture which can be positioned in a series of continuous overlapping positions with the imaging hole. The diaphragm disk or ruler also include lenses with different focal lengths, which, when positioned in front of the imaging hole allow the camera obscura to function as a photo-camera.

20 Claims, 3 Drawing Sheets

ZOOM CAMERA OBSCURA

FIELD AND BACKGROUND OF THE INVENTION

The camera obscura (referred to hereinafter simply as "CO") has been known for many hundreds of years. As its names implies, it was originally a dark ("obscure") room ("camera") with a small round hole in one of its walls, through which the outside view was formed as an upside down (inverted) image on an internal wall or screen opposite to the hole. Portable COs have also been known for at least three hundred years. The use of a lens inserted into the hole, which changes the CO into a photo-camera, appears to date back to the Renaissance. Portable cameras incorporating both lenses and a telescopic mechanism were known already in the $17^{th}$ century. Such "telescopic" cameras had a box-within-a-box or tube-within-a-tube structure. The external box or tube had an external planar wall with a small hole fitted with a lens, and the internal box or tube had an internal planar wall parallel to the holed external wall, and covered by a semitransparent screen, sheet of paper, or similar material. The purpose of the telescopic structure was to bring the image formed by the lens on the semitransparent screen into focus.

The historical portable CO, in addition to being chiefly an amusement device, has been widely applied as a drawing aid. The teaching of various optical principles that form the basis of the CO effect is however invariably done with very simple implements. For example, in photography courses, students typically use improvised COs made of small boxes into which they drill a small hole. Prior art embodiments of a CO cannot illustrate the change in size of an image, which results from a change in the distance between the CO screen and a lens-less hole, the size change referred to herein as a "zoom" action of the CO. Known prior art embodiments also invariably use a fixed size hole, which determines the amount (intensity) of light entering the camera, and consequently the sharpness of the image. It is well known that a smaller hole reduces the light intensity but increases the sharpness (similar to the diaphragm action in a photography camera), however this effect is normally demonstrated by using different holes with different sizes in separate COs, in what we define as a "discontinuous" action, in contrast with the continuous diaphragm action of the present invention.

There is thus a widely recognized need for, and it would be highly advantageous to have, a portable camera obscura capable of demonstrating a zoom action and a continuous diaphragm action, as well as other principles of photography, all in one unit. Such a device will be referred to hereafter as a "zoom camera obscura" or simply a "zoom CO".

SUMMARY OF THE INVENTION

According to the present invention there is provided a portable zoom camera obscura, comprising: a) a telescopic structure including an inner tube and an outer tube, each of the tubes having an inner end and an outer end, the outer end of the outer tube constituting an imaging end, the outer end of the inner tube constituting a viewing end, the tubes positioned concentrically and slidingly movable relative to each other; b) a cover attached to the imaging end, the cover having a centered imaging hole; c) a screen covering the inner end of the inner tube; and d) a cover attached to the viewing end, the cover having a viewing hole.

According to one feature in the preferred embodiments of the zoom camera obscura of the present invention, there is provided a diaphragm disc pivotally mounted at its center to an off-center point on the cover of the imaging end.

According to another feature in the preferred embodiments of the zoom camera obscura of the present invention, the diaphragm disk includes at least one diaphragm aperture that can be positioned to provide a series of continuously changing overlap positions with the imaging hole.

According to yet another feature in the preferred embodiments of the zoom camera obscura of the present invention, there is provided a diaphragm ruler slidingly mounted on the cover of the imaging end.

According to yet another feature in the preferred embodiments of the zoom camera obscura of the present invention, the diaphragm ruler includes at least one diaphragm aperture that can be positioned to provide a series of continuously changing overlap positions with the imaging hole.

According to yet another feature in the preferred embodiments of the zoom obscura of the present invention, the diaphragm disk and the diaphragm ruler each include at least one lens.

The portable zoom camera obscura of the present invention is particularly useful as a teaching aid for teaching photography, graphic arts and science students the principles of the camera obscura and of photography, and as a general amusement device for young and old alike.

The present invention successfully addresses the shortcomings of the presently known configurations by providing a simple, portable device, which can illustrate not only the workings of the camera obscura and of a photographic camera together in one device, but can also show zoom and diaphragm effects without the presence of a lens.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a teaching aid and amusement device that illustrates the principle and operation of the camera obscura. Specifically, the present invention can be used to illustrate a zoom effect in a camera obscura, to illustrate the trade-off between image brightness and image sharpness in a camera obscura, and to illustrate some basic operation principles of photographic cameras.

The principles and operation of a zoom CO according to the present invention may be better understood with reference to the drawings and the accompanying description.

Figure 1:
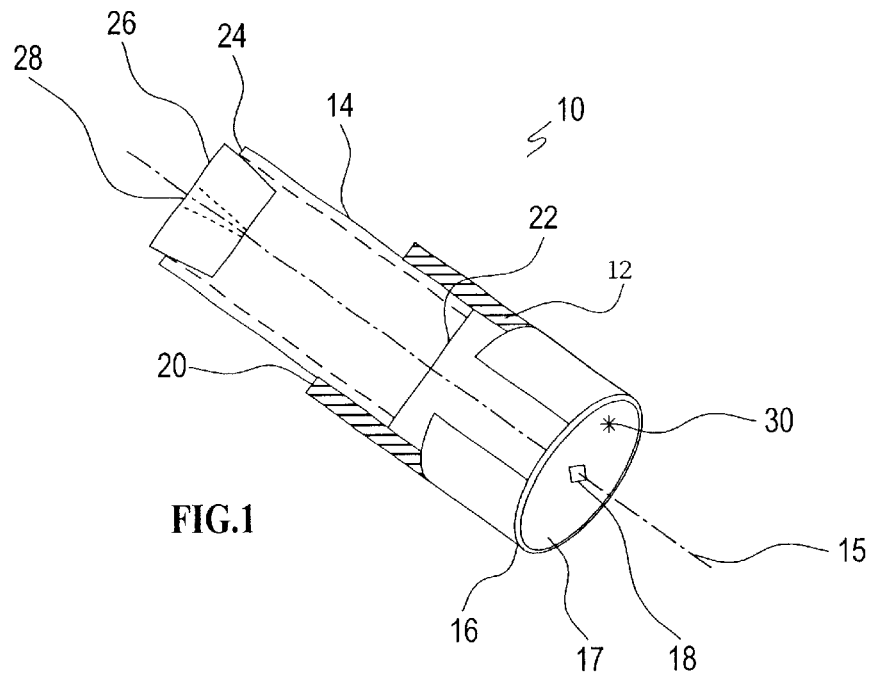
FIG. 1 illustrates in cross-section a preferred embodiment of the zoom camera obscura of the present invention.

Referring now to the drawings, FIG. 1 illustrates a preferred embodiment of the portable zoom camera obscura of the present invention. A zoom CO 10 has a "tube-within-a-tube" telescopic structure of an outer hollow tube 12 and an inner hollow tube 14, tubes 12 and 14 slidingly movable relative to each other along a common axis 15. Tubes 12 and 14 are concentric and preferably cylindrical, however they may have other common cross-section shapes, for example square, hexagonal, octagonal, etc. Tubes 12 and 14 are preferably made of a light material such as plastic or cardboard. The dimensions (length and diameter) of CO 10 are preferably such that the CO is easily held and operated by an adult and even by a child. Tube 12 has one outer imaging end 16 to which there is attached a cover 17 that contains a small, centered, imaging hole 18, and another inner, open end 20, which accommodates inner tube 14, so that tube 14 can slide in and out of tube 12 easily. The shape of hole 18 is chosen according to the particular effect that the CO is used for. For example, for the illustration of a continuous diaphragm effect, hole 18 will be preferably given a shape that results in the best overlap with a diaphragm aperture, as described and defined hereinbelow. For the illustration of a discontinuous diaphragm effect, where round diaphragm apertures with different sizes are used to overlap hole 18, hole 18 is preferably round. Tube 14 and end 20 have a tight enough fit at their common boundary to prevent light from seeping into the CO around the boundary, the fit nevertheless allowing free mutual sliding. Tube 14 has an inner end 22 covered by a semitransparent thin sheet or screen (hereafter "screen 22"), made for example from wax paper, thin white cloth or white plastic, semitransparent ("matte") glass, or other similar material. Another, outer end 24 of tube 14 serves as a "viewing end", which a viewer positions close to his eye. End 24 includes a cover 26 with a viewing hole 28 that can have any common shape. Preferably, cover 26 includes a plug made of a soft material such as a dense sponge (hereinafter "plug 26") inserted in end 24. Viewing hole 28 is preferably centered so that its axis coincides with the common longitudinal axis 15 of tubes 12 and 14.

Figure 2A:
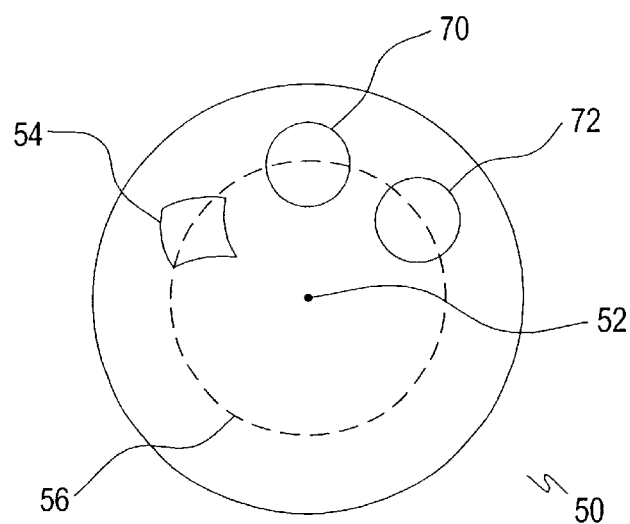
FIG. 2 illustrates a preferred embodiment of a continuously changing diaphragm disc having one aperture and two openings fitted with lenses.
Figure 2B:
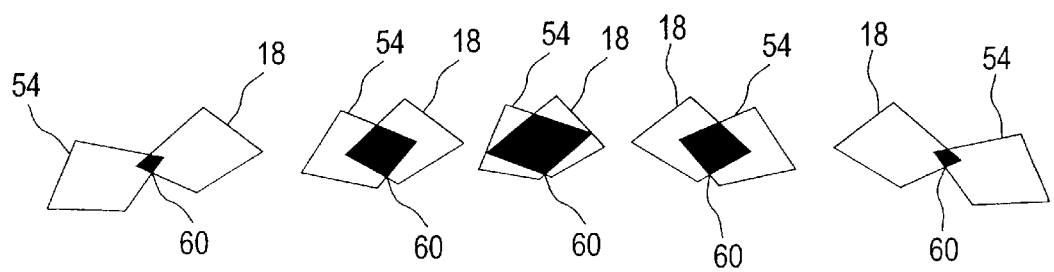
Figure 3:
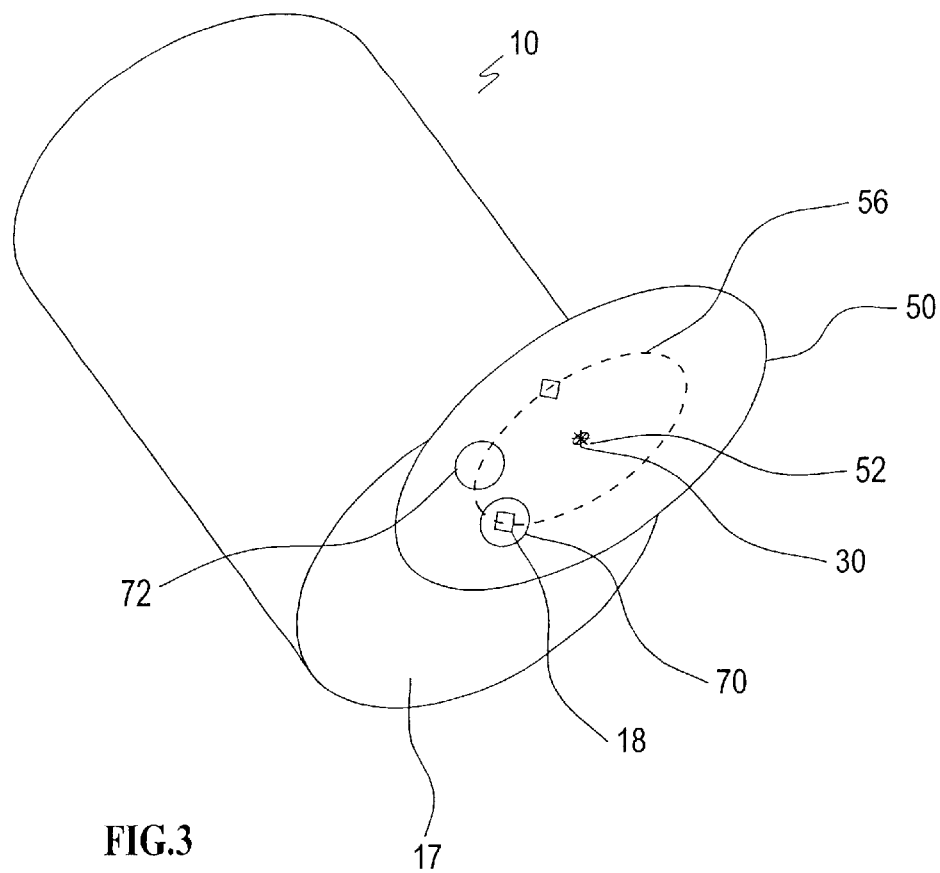
FIG. 3 illustrates in perspective an off-centered attachment of a diaphragm disc.

FIG. 2 shows in "a" a preferred embodiment of a diaphragm disc 50, which has a center 52. In FIG. 3, disk 50 is shown pivotally mounted to the zoom CO through center 52 at an off-center ("eccentric") attachment point 30 on cover 17. Disk 50 is made of a light and stiff material, preferably similar to the material of the zoom CO. The attachment can be through a small screw or any other pivoting means that allow disc 50 to rotate around point 30. Disk 50 has a continuous diaphragm aperture 54, positioned on a circle 56 centered at center 52 and having a radius equal to the distance between point 30 and hole 18. A slow rotation of disk 50 around point 30 brings aperture 54 into a series of continuously changing (in shape and size) overlap positions with hole 18, defined by an opening 60 having a variable shape and size. A series of overlap positions illustrating the relative lateral movement of aperture 54 and hole 18, as well as the resultant opening 60, are shown in FIG. 2 "b". When partially or fully overlapping hole 18, aperture 54 acts as a diaphragm that controls the amount of light entering the zoom CO through hole 18. Hereafter, the action that brings an aperture into overlap with hole 18 is referred to as "opening" or "closing" the diaphragm. This action, as explained above, is "continuous" and as such novel, and unique to the present invention.

In order to act efficiently as a diaphragm, the optimal shape of overlap opening 60 should be preferably round (circle). Ideally, opening 60 should keep its shape constant (i.e. have a "self-similar" shape) while increasing and decreasing its diameter with the change in the degree of overlap. As it is practically impossible to obtain a round overlap opening by any relative lateral movement of two holes, including the movement described in FIG. 2, aperture 54 and hole 18 are preferably given shapes that provide an opening 60 as close to circular as possible. By giving both aperture 54 and hole 18 the roughly rhomboidal shape shown in FIG. 2 "b", opening 60 receives a roughly self-similar square shape, which approximates the ideal round opening quite well.

In addition to the continuous diaphragm aperture 54, disk 50 preferably includes two or more round openings positioned on circle 56 and fitted with lenses. FIG. 2 "a" shows two such lenses 70 and 72. Each of the two lenses has a different focal length "f". The rotation of the disk around its off-center mounting can bring each lens to overlap hole 18. The diameter of each lens must be large enough to completely overlap hole 18. When a lens is positioned in front of hole 18, the CO turns into a regular photo-camera.

It is evident that the shape of disk 50 in FIGS. 2 and 3 is round for illustrative purposes only, and that the essential requirement from a diaphragm disk is to allow a continuous overlap between an aperture on the disk and the CO imaging hole, through an eccentric rotation. Most generally, the diaphragm disk can have any shape including that of a "pizza slice", a square, etc., as long as the essential requirement above is fulfilled.

In use, to illustrate a "zoom" action, a viewer presses his/her eye against plug 26, sealing end 24 against any possible light seeping into the CO from this end, aims the CO toward an external object or scene, slowly closes the diaphragm to a degree that still allows enough light to provide a good, visible image, and slides tubes 12 and 14 relative to each other in a telescopic motion. An image of the object or scene (not shown) is formed through hole 18 on screen 22, which is viewed by the viewer through hole 28. The image formed on screen 22 is inverted and not sharp (is "unfocussed"), as common in a CO. However, the extent of the "unfocus" is minimized by closing the diaphragm or reducing the aperture size. The image size changes as function of the distance between the screen and hole 18, i.e. the viewer sees a "zoom" effect when he/she moves tubes 12 and 14 relative to each other in a telescopic fashion. This illustration of a zoom effect using a simple telescopic embodiment of the CO is novel and unexpected, and can serve as an important teaching aid in explaining optical and photography principles. The zoom CO of the present invention also serves as a general amusement device for young and old.

Figure 4:
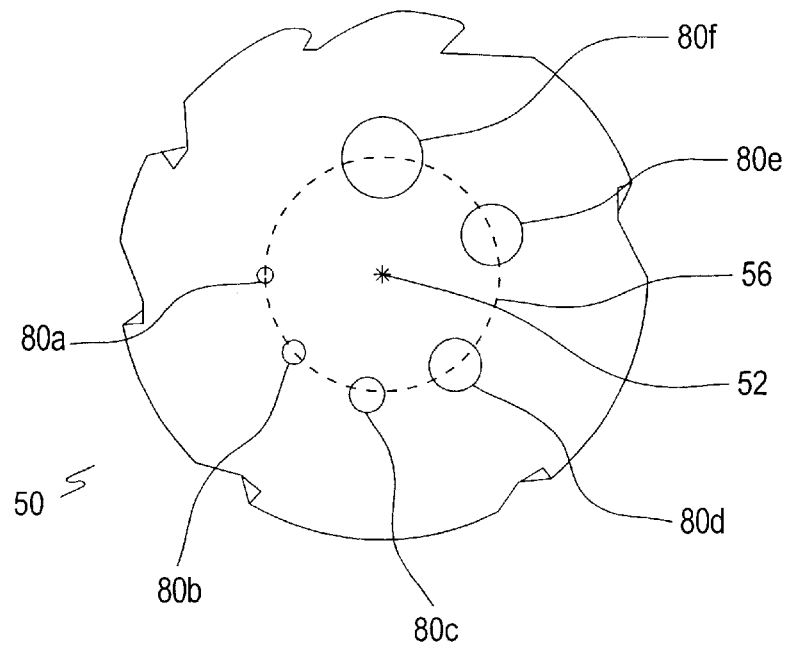
FIG. 4 illustrates an embodiment of a multiple opening diaphragm disc.

A combination of a CO and a diaphragm disc can also be used to illustrate a discontinuous diaphragm effect. Additional apertures with different sizes can be placed on circle 56, to act as diaphragms when brought into partial or full overlap with hole 18. In this case of multiple apertures placed on the same circle 56, both the apertures and hole 18 should preferably be round. FIG. 4 shows a number of such apertures 80, increasing in size from 80a to 80f. As mentioned, hole 18 must be smaller than the smallest aperture (in FIG. 4, aperture 80a) because in this case the diaphragm effect is similar to that of a conventional camera. In contrast with prior art COs, the embodiment of FIG. 4 enables the illustration of a diaphragm effect using a single element (the disk) in conjunction with the CO.

Figure 5:
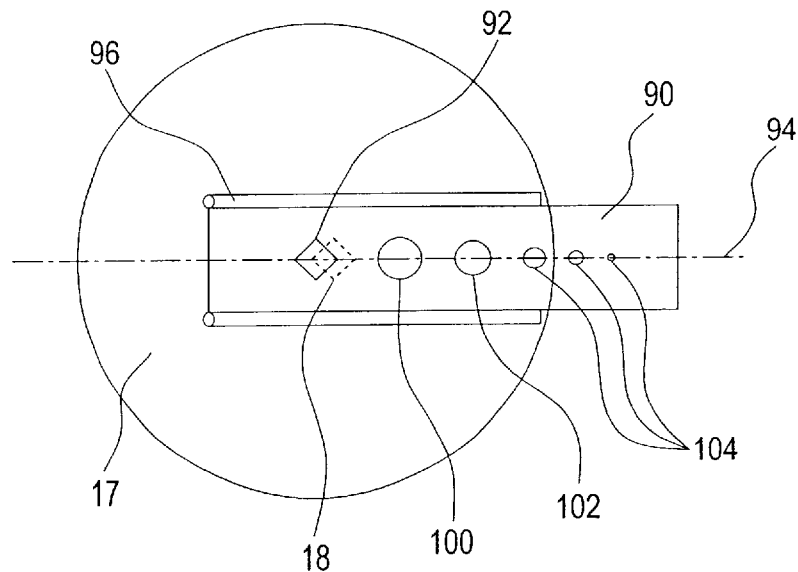
FIG. 5 illustrates a preferred embodiment of a continuously changing diaphragm ruler having one aperture and two openings fitted with lenses
Figure 5:
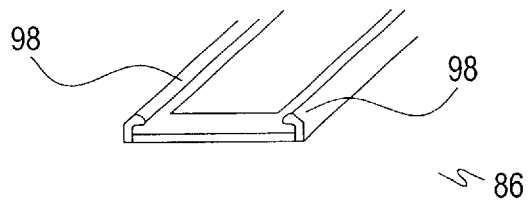

FIG. 5 shows yet another preferred embodiment that provides a continuous diaphragm effect to the zoom CO. In this embodiment, a diaphragm ruler 90 has an aperture 92, preferably roughly square, the square positioned with its diagonal parallel to an axis 94. Ruler 90 is slidingly mounted on cover 17, for example by attaching to cover 17 an appropriate guiding means 96. Means 96 guides ruler 90 in a sliding linear motion in a plane close to, and parallel with, the plane of cover 17, so that axis 94 overlaps the center of hole 18, which, in this embodiment, is also preferably roughly square and aligned with aperture 92. Means 96 can be a flat guiding profile with raised corners 98, as shown in a separate detail in FIG. 5. A sliding movement of diaphragm ruler 90 along axis 94 positions aperture 92 in a continuously changing overlap with hole 18, causing the same continuous diaphragm effect as the diaphragm disk of FIG. 2. In the preferred embodiment of FIG. 5, the overlapping area is roughly square, being obtained by two corners of two roughly square holes moving relative to each other along a common diagonal that overlaps axis 94. In analogy with the disk of FIG. 2, the diaphragm ruler can also be equipped with additional openings fitted with different focal length lenses, for example lenses 100 and 102, positioned along axis 94. In analogy with the discontinuous diaphragm implementation of apertures 80 in FIG. 4, preferably round apertures 104 of different sizes can added on axis 94 of the same diaphragm ruler or on a separate ruler In use, to illustrate a continuous diaphragm action, the viewer holds the zoom CO with one hand, and slowly rotates the diaphragm disk, or slowly slides the diaphragm ruler with his/her other hand to bring an aperture 54 or 92 to overlap hole 18. The image on screen 22 (FIG. 1) consists of a convolution of diffraction fronts (in a planar description these are diffraction circles) emanating from each point (pixel) of the external object. By changing the preferably square overlap between the aperture and hole 18, the viewer changes the amount of light acquired from each pixel, as well as the amount of diffraction (diameter of each diffraction circle). A smaller overlap (closing the diaphragm) decreases the diffraction diameters, thus increasing the image sharpness, and at the same time decreases the amount of light, thus lowering the brightness of the acquired image. A larger overlap increases the brightness, but decreases the image sharpness.

A similar but discontinuous diaphragm effect can be obtained by bringing variable diameter apertures mounted on the same diaphragm disk or ruler into a full overlap with hole 18. A round aperture centered on hole 18 restricts the amount of light entering the CO. The smaller the aperture, the lower the light intensity of the image formed on the CO screen, and the sharper the image. A larger aperture centered on hole 18 will provide a higher intensity but a lower sharpness.

Returning now to the lenses in FIGS. 2 and 5, each lens has preferably a different focal length "f". The zoom CO of the present invention, functioning now as a regular camera, can thus be used to illustrate the principle of focus in photography. The well-known lens equation:

$$1/a + 1/b = 1/f \quad (1)$$

where "a" is the distance between the viewed object and the lens, and "b" is the distance between the lens and the screen on which the image is formed (screen 22 in FIG. 1), determines that for a given focal length "f", there is only one screen-lens distance "b" at which an image distanced "a" from the lens will appear sharp. The distance "b" can be adjusted by the telescopic movement of tubes 12 and 14 to bring any object viewed with the zoom CO into focus on screen 22.

With a known focal length lens, the zoom CO of the present invention can be used to measure the approximate distance (range) between a viewed object and the viewer, since from equation 1:

$$a = bf/(b-f) \quad (2)$$

Figure 6:
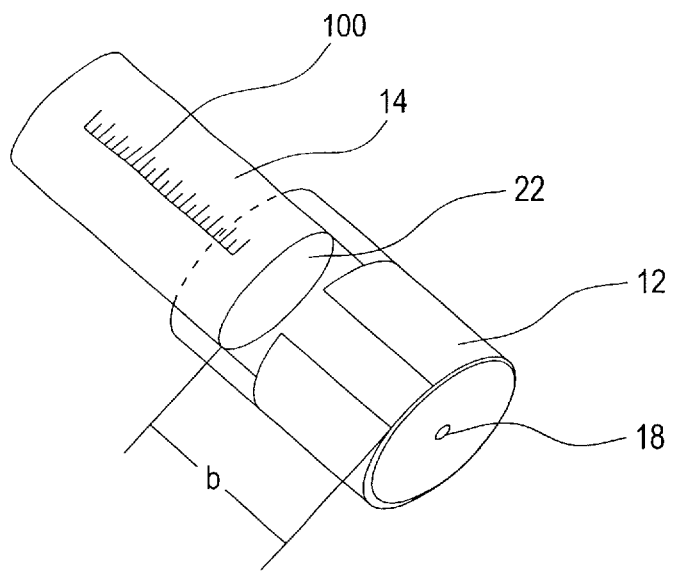
FIG. 6 illustrates an implementation of the distance measurement feature.

FIG. 6 illustrates a possible implementation of the distance measurement feature. A scale 110 can be drawn or otherwise attached to the surface of inner tube 14 in parallel with the tube long axis. The markings of scale 110 can be calibrated to indicate the relative telescopic movement of tubes 12 and 14, i.e. the distance "b" between screen 22 and hole (including lens) 18. If "f" and "b" are known for any object brought into focus on screen 22, its distance "a" can be calculated using equation 2. For a given "f", scale 110 can be calibrated to directly read-out distance "a". In practice, the range of distances "a" measurable with the zoom CO is limited to close objects, i.e. objects up to a few meters away from the CO. However, this range can clearly be extended by using larger focal length lenses.

In addition to its use for distance measurement, the zoom CO of the present invention can be used to illustrate the connection between focal length and a magnification m=a/b. From equation 2, for any given "b", "a" is fixed by a given "f". Thus there is a direct relationship between "m" and "f". Scale 110 can be calibrated to directly read out the magnification "m" for a given "f". When the viewer views an object positioned at a distance "a", the size of the image seen on screen 22 will be "m" times smaller. Changing the lens to one with a different "f" will change the size of the image accordingly.

Finally, an additional use of the zoom CO is the safe viewing of solar eclipses by attaching an optical filter of adequate density (not shown) to end 16 (FIG. 1).

While the invention has been described with respect to a limited number of embodiments, it will be appreciated that many variations, modifications and other applications of the invention may be made.

What is claimed is:

1. A portable zoom camera obscura, comprising:

a) a telescopic structure including an inner tube and an outer tube, each of said tubes having an inner and an outer end, said outer end of said outer tube constituting an imaging end, said outer end of said inner tube constituting a viewing end, said tubes positioned concentrically and slidingly movable relative to each other;

b) a cover attached to said imaging end, said cover having a centered imaging hole;

c) a screen covering said inner end of said inner tube; and d) a cover attached to said viewing end, said cover having a viewing hole.

2. The zoom camera obscura of claim 1, wherein said inner and said outer tube are cylindrical.

3. The zoom camera obscura of claim 1, wherein said inner and said outer tube have a cross-section selected from the group consisting of squares, hexagons and octagons.

4. The zoom camera obscura of claim 1, wherein said screen includes a semitransparent material.

5. The zoom camera obscura of claim 4, wherein said semitransparent material is selected from the group consisting of regular paper, wax paper, white cloth, white plastic and opaque glass.

6. The zoom camera obscura of claim 1, wherein said viewing end includes a plug.

7. The zoom camera obscura of claim 6, wherein said plug is made of a soft material.

8. The zoom camera obscura of claim 1, further comprising a diaphragm disc pivotally mounted at its center to an off-center point on said cover of said imaging end.

9. The. zoom camera obscura of claim 8, wherein said diaphragrm disk includes at least one diaphragrm aperture that can be positioned to provide a series of continuously changing overlap positions with said imaging hole.

10. The zoom camera obscura of claim 9, wherein said imaging hole and said at least one diaphragm aperture have shapes chosen to provide an overlapping area that keeps a self-similar shape while changing its size.

11. The zoom camera obscura of claim 8, wherein said diaphragm disk includes at least one lens.

12. The zoom camera obscura of claim 1, further comprising a diaphragm ruler slidingly mounted on said cover of said imaging end.

13. The zoom camera obscura of claim 12, wherein said diaphragm ruler includes at least one diaphragm aperture that can be positioned to provide a series of continuously changing overlap positions with said imaging hole.

14. The zoom camera obscura of claim 13, wherein said imaging hole and said at least one diaphragm aperture have shapes chosen to provide a square overlapping area.

15. The zoom camera obscura of claim 12, wherein said diaphragm ruler includes at least one lens.

16. The zoom camera obscura of claim 9, further comprising a scale attached to said inner tube.

17. The zoom camera obscura of claim 11, further comprising at least one scale attached to said inner tube.

18. The zoom camera obscura of claim 17, wherein said at least one scale is calibrated to indicate a measurement of one of the group selected from distance and magnification.

19. The zoom camera obscura of claim 15, further comprising at least one scale attached to said inner tube.

20. The zoom camera obscura of claim 19, wherein said at least one scale is calibrated to indicate a measurement of one of the group selected from distance and magnification.

* * * * *